United States Patent

Alexander et al.

[11] Patent Number: 4,917,868
[45] Date of Patent: Apr. 17, 1990

[54] POOL CHEMICAL DISPENSER

[76] Inventors: Roy P. Alexander, 23 Rt. 81, Killingworth, Conn.; Alan H. Milford, 120 Wakefield St., Hamden, Conn. 06517

[21] Appl. No.: 117,388

[22] Filed: Oct. 30, 1987

Related U.S. Application Data

[63] Continuation of Ser. No. 881,532, Jul. 2, 1986, abandoned.

[51] Int. Cl.[4] .................................................. B01F 1/00
[52] U.S. Cl. ................................... 422/119; 137/268; 210/242.1; 222/235; 422/264; 422/265; 422/275; 422/276; 422/277
[58] Field of Search ............... 422/119, 263, 264–266, 422/274–277, 279; 210/169, 198.1, 242.1; 222/325; 239/310; 137/268

[56] References Cited

U.S. PATENT DOCUMENTS

| D. 251,571 | 4/1979 | Lieberg | D23/3 |
|---|---|---|---|
| 1,168,612 | 1/1916 | Durning | 422/274 |
| 2,445,240 | 11/1948 | Dupler | 422/264 B |
| 3,495,948 | 2/1970 | Long et al. | 239/310 |
| 3,598,536 | 8/1971 | Christensen | 23/267 A |
| 3,607,103 | 9/1971 | Keifer | 422/119 |
| 3,753,659 | 8/1973 | Raubenheimer | 422/264 |
| 3,846,078 | 11/1974 | Brett | 23/267 A |
| 3,867,101 | 2/1975 | Herring | 422/119 |
| 4,023,778 | 5/1977 | Joly et al. | 239/310 |
| 4,217,331 | 8/1980 | Schaub | 422/265 |
| 4,252,773 | 2/1981 | Spiegel et al. | 422/264 |
| 4,419,233 | 12/1983 | Baker | 210/169 |

Primary Examiner—Barry S. Richman
Assistant Examiner—Timothy M. McMahon

[57] ABSTRACT

A pool chemical dispenser utilizing a flotation device to hold the dispenser on the surface of a body of water such as a swimming pool and a pool chemical-containing cartridge that fits within the flotation device is provided. The cartridge is intended to hold a fast dissolving pool chemical, such as calcium hypochlorite, and is equipped with a cartridge skirt and a cartridge skirt insert with a pool chemical tablet support grid to ensure partial immersion of the pool chemical tablet closest to the water.

20 Claims, 8 Drawing Sheets

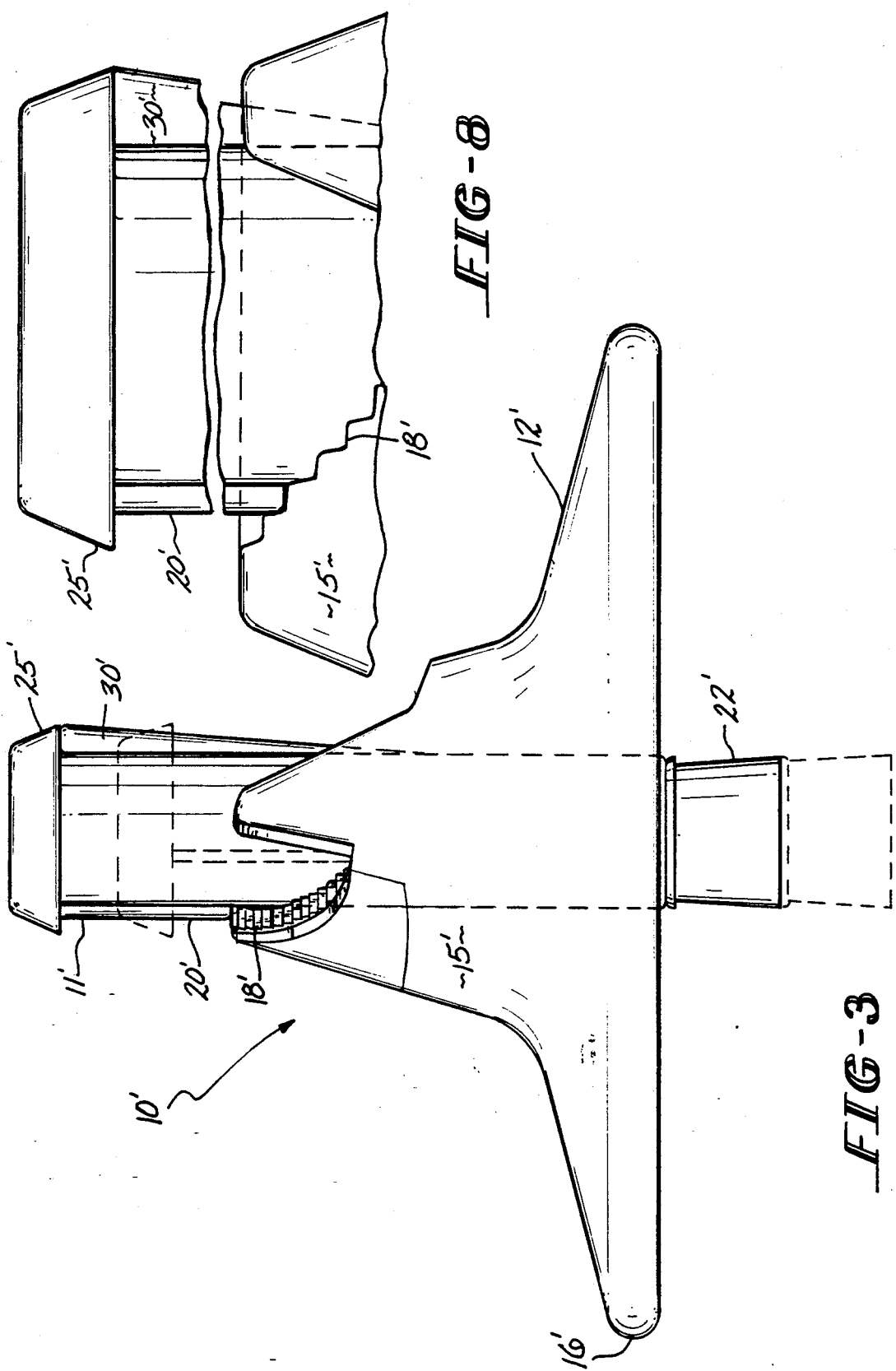

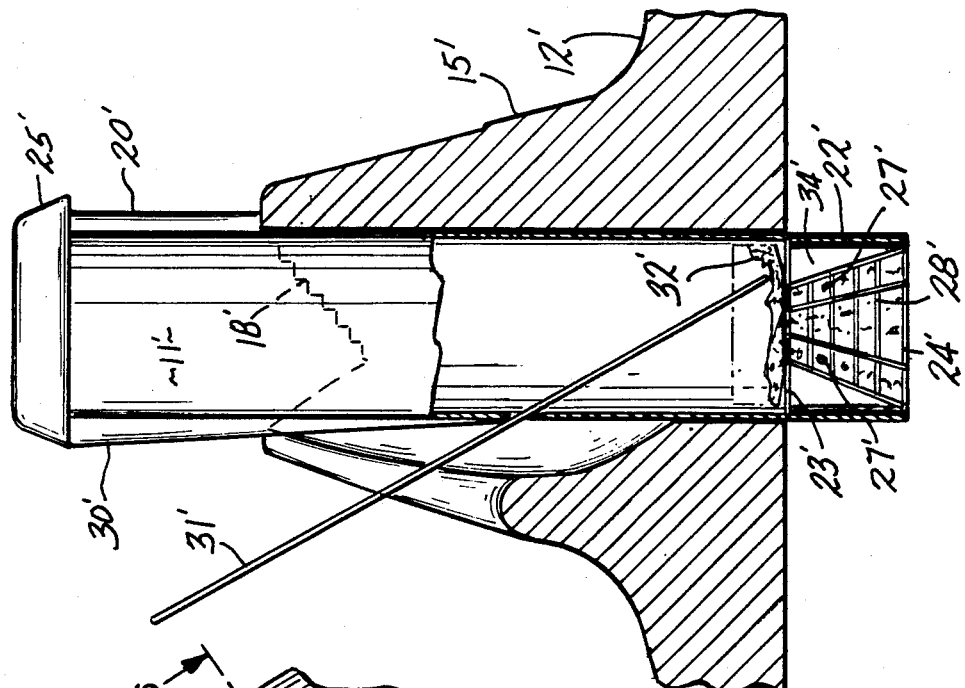
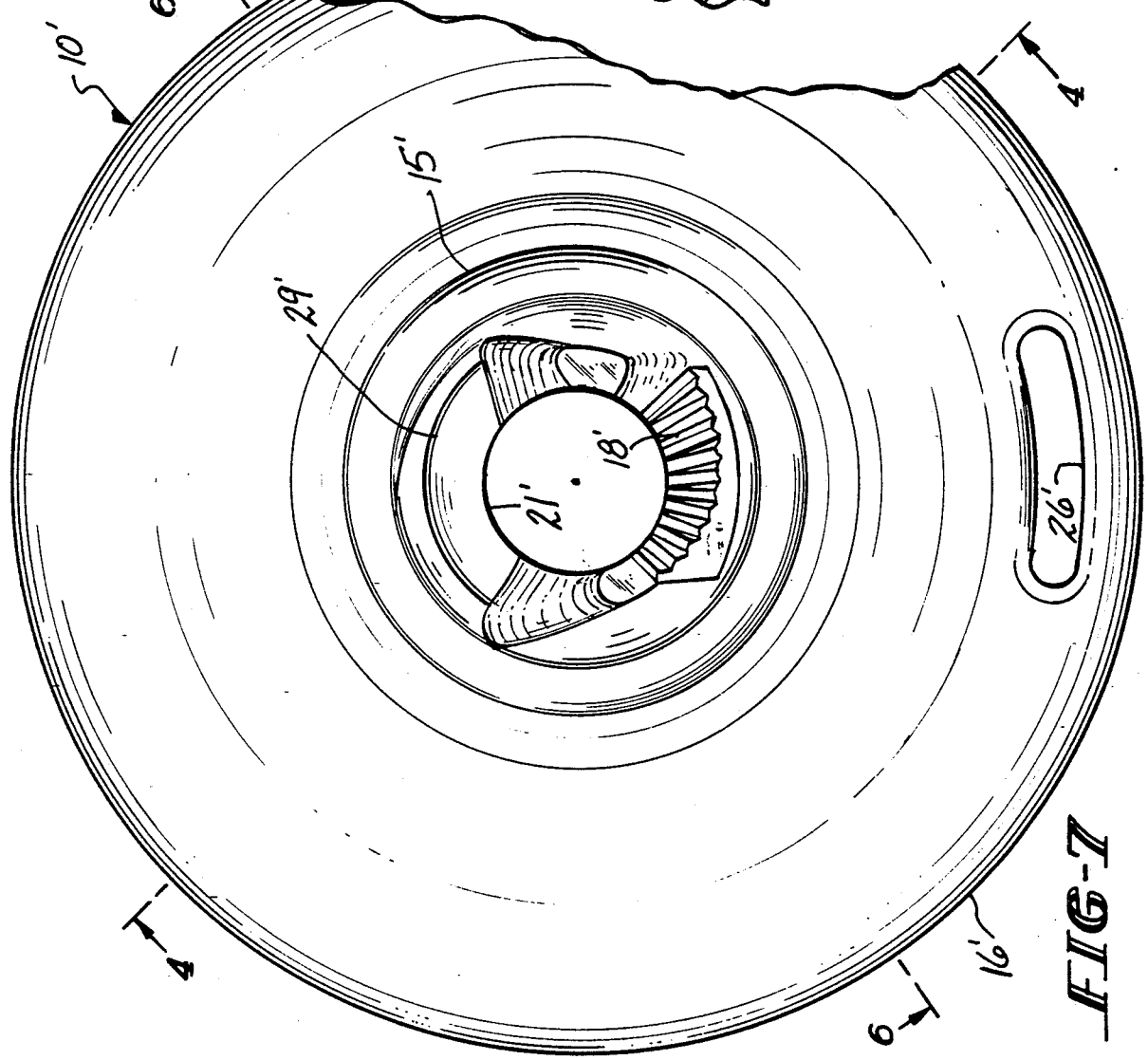

POOL CHEMICAL DISPENSER

This application is a continuation of U.S. application Ser. No. 06/881,532 filed Apr. 2, 1986 and now abandoned.

BACKGROUND OF THE INVENTION

This invention relates generally to chemical dispensers for use in bodies of water. More particularly it relates to a pool chemical dispenser that is designed to float on the surface of a body of water and control the dissolving rate of a rapidly dissolving pool chemical, such as calcium hypochlorite, through the use of a unique tablet support and immersion system.

The use of chemical feeders to dispense water treatment chemicals into bodies of water, such as swimming pools and spas, have long been known. Such feeders have either floated on top, or just beneath, the surface of water. Other feeders have been employed in the flow loop of forced circulation systems to utilize the movement of water by the circulation pump after the water passed through a filter to dispense pool chemicals into the swimming pool or spa.

The most successful pool chemical dispensers have employed trichloroisocyanurate as the chemical that is dispensed into the water. Trichloroisocyanurate feeders have either utilized a floating container in which all of the material to be dissolved is continuously in contact with the water, have or utilized vertically extending chemical containers that can fully immerse only a portion of the pool chemical to be dissolved. Some feeders have been able to selectively control the dissolving rate of the pool chemical by vertically adjusting the depth of immersion of the cartridge containing the pool chemical in the water. This latter feature also provides a means to control the dissolving rate or introduction rate of the pool chemical into solution in the water. Since trichloroisocyanurate is a chemical which in tablet form dissolves slowly without leaving insoluble residue, it can be dispensed to swimming pools and spas at proper dosage levels using simple, low cost floating feeders.

However, where a fast dissolving chemical, such as calcium hypochlorite, is attempted to be used as the sanitizing chemical to treat water, controlling the dissolving rate of the pool chemical to provide a uniform introduction rate of the sanitizing chemical into the body of water over a length of time sufficiently long to be practical has presented a serious problem. Additional problems were presented to chemical feeder designers who attempted to utilize calcium hypochlorite as the pool chemical because of the insoluble residue formed when calcium hypochlorite dissolves in water. Prior floaters immerse the entire mass or tablet of pool chemical. Where substantially the entire tablet is calcium hypochlorite, this is impractical. This will cause increased formation of insoluble residues, such as calcium carbonate. This residue would either plug the feeding orifices from the cartridge or container to the surrounding body of water to prevent the flow of sanitizing chemical outside of the container, or would leave behind an aesthetically unacceptable trail of insoluble residue particles in the water.

Further, prior feeders gave no definite indication of when the pool chemical had been completely dispensed from the floating device and needed to be replaced. These feeders that do give some indication accomplish it by gradual inversion.

These problems are solved in the design of the present invention which embodies a pool chemical dispenser for use in the dispensing of a fast dissolving pool chemical, such as calcium hypochlorite, with an adjustable dispensing rate without leaving a detectable trail of insoluble residue.

SUMMARY OF THE INVENTION

It is an object of the present invention to provide a pool chemical dispenser that provides a controlled and preferably uniform dissolving rate for a rapidly dissolving pool chemical.

It is another object of the present invention to provide a pool chemical dispenser that utilizes a tablet-containing cartridge having an open-bottomed skirt with a grid to support the pool chemical tablets and to control water turbulence adjacent the tablets to ensure uniform and controlled pool chemical dissolution.

It is another object of the present invention to provide an apparatus that will indicate when the cartridge has dispensed all of its pool chemical.

It is a feature of the present invention that continuous, controlled and preferably uniform dissolving of the fast dissolving pool chemical can be obtained utilizing the pool chemical dispenser of the present design for use in residential sized pools.

It is another feature of the present invention that insoluble residue build-up does not occur within a pool chemical dispenser.

It is still another feature of the present invention that the tablet container is vertically adjustable in a float device to control the level of immersion and the dissolving rate of the fast dissolving pool chemical tablet.

It is an advantage of the present invention that a controlled and uniform dissolving rate of fast dissolving pool chemical, such as calcium hypochlorite, is obtained.

It is another advantage of the present invention that is readily ascertained when additional pool chemical must be added to the pool chemical dispenser.

It is still another advantage of the present invention that no detectable trail or accumulation of insoluble residue is obtained by the use of the subject pool chemical dispenser.

These and other objects, features and advantages are obtained by the use of a floating pool chemical dispenser which utilizes an external floater portion with a pool chemical containing cartridge that includes an open-bottomed skirt portion with a pool chemical supporting grid that serves to reduce the turbulence of the water adjacent and striking the pool chemical and provides a uniform dissolving rate of the pool chemical without build-up of insoluble residues.

BRIEF DESCRIPTION OF THE DRAWINGS

The objects, features and advantages of the invention will become apparent upon consideration of the following detailed disclosure of the invention, especially when it is taken in conjunction with the accompanying drawings wherein:

FIG. 3 is a side elevational view of an alternate embodiment of the pool chemical dispenser showing the vertical adjustability of the tablet-containing cartridge with the cartridge shown in a raised position by solid lines and in a lowered position providing greater pool chemical immersion by the phantom lines;

FIG. 6 is a partial sectional view of the pool chemical dispenser of FIG. 3 showing the cartridge seated on a cartridge-receiving step and a portion of the cartridge broken away to reveal the position of the indicator flag when a portion of the pool chemical remains to be dissolved;

FIG. 7 is a top plan view of a portion of the pool chemical dispenser of FIG. 3;

FIG. 8 is an enlarged partial view of the cartridge and the cartridge retaining steps of the pool chemical dispenser of FIG. 3;

DETAILED DESCRIPTION OF THE PREFERRED EMBODIMENT

Figure 1:
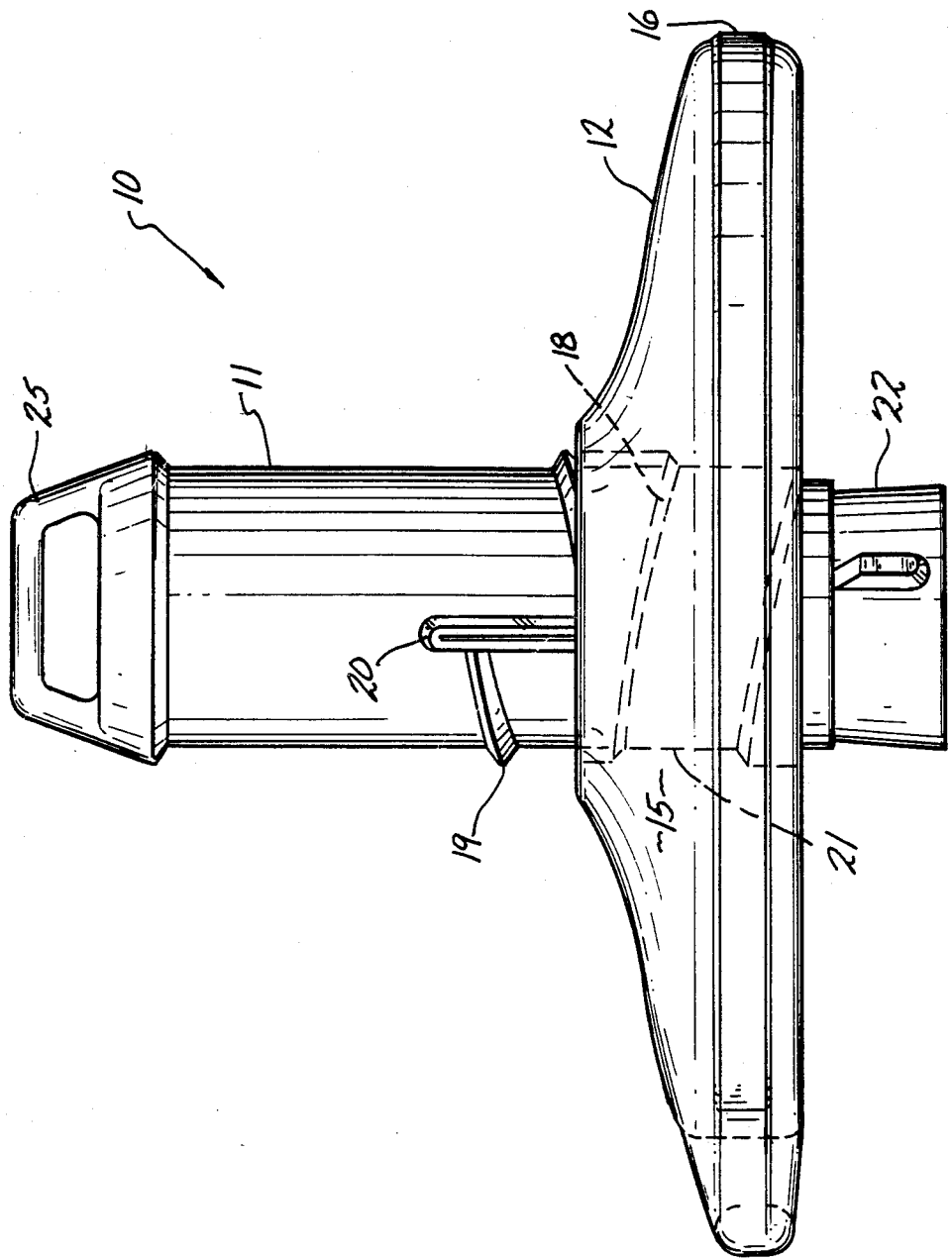
FIG. 1 is a side elevational view of the pool chemical dispenser with a tablet-containing cartridge inserted within the floater.

The pool chemical dispenser, indicated generally by the numeral 10, in FIG. 1 can be seen as having a generally circular floater 12 through which a cartridge 11 fits. The floater 12 has a sloped top 15 with a circular edge 16 that sits in the water such that the cartridge skirt 22 sits beneath the bottom of the floater 12 in the water. Depending on the weight of the pool chemical within the cartridge 11, the water level extends up along the circular edge 16 of the floater 12. The interior of the floater 12 has a central opening 21 that is generally circular and has cartridge receiving tracks 18 radially extending thereabout to seat the cartridge 11 therein. Cartridge grooves 19 and vertical alignment and locking grooves 20 position the cartridge 11 within the floater 12 and control the level and depth of immersion of the skirt 22 in the water. The vertical alignment and locking grooves 20 fixes the cartridge 11 in a set position.

Figure 2:
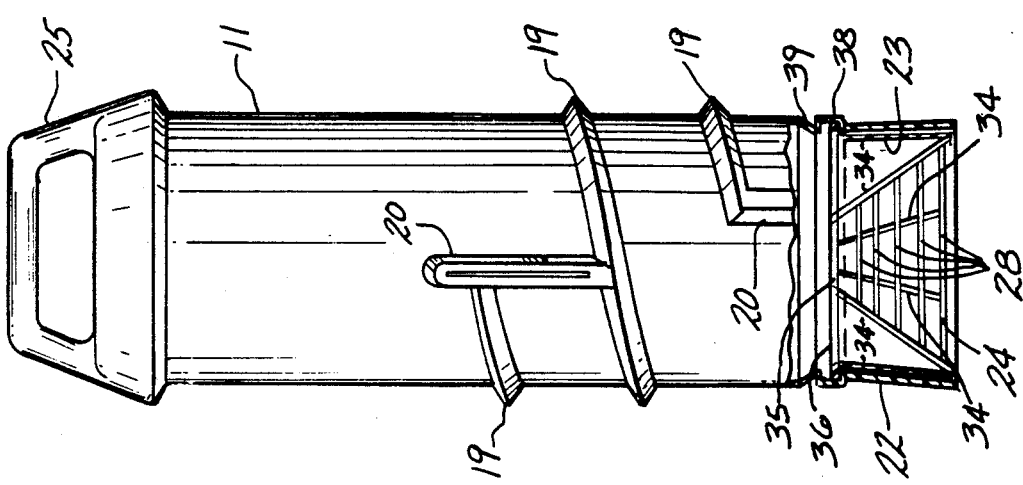
FIG. 2 is a side elevational view of the tablet-containing cartridge with a portion of the skirt at the bottom of the cartridge broken away to show the tablet support grid.

As seen in FIG. 2, the cartridge 11 has a top 25 with a handle grip to facilitate holding the pool chemical dispenser 10 or the individual cartridge 11. The vertical alignment and locking grooves 20 fit within appropriate recesses (not shown) within the central opening 21 of the floater 12.

As seen in FIG. 2, the lower portion of the cartridge 11 has a skirt 22 within which is inserted an insert 23 that includes a pool chemical support grid 24. The support grid 24 includes the concentric circle grid elements 28 that are of decreasing radius from the bottom of the skirt 22 to the top. The combined effect cartridge grid 24 and concentric grid circle elements 28 provide a protective shield or baffle to obtain quiescent water immediately adjacent and below the bottom of the lowest tablet or mass of swimming pool chemical in the cartridge 11. This area of calm, quiet water reduces the amount of pool chemical immersed in the water and minimizes the effects of choppy water or waves created by activity in the swimming pool. This quiescent area of water permits the concentration of pool chemical in solution within the open-bottomed cartridge to increase. This concentrated solution slows down the dissolving rate of the pool chemical since the concentrated solution is not dispersed rapidly by choppy water or waves. This, thereby, assists in obtaining a uniform dissolving rate of a pool chemical.

The concentric circle grid elements 28 and the tablet support cartridge grid 24 provide a uniform series of openings that permit any small solids and solubles generated by the dissolution of the calcium hypochlorite in the water to fall through into the pool water but prevent large chunks of solids and insoluble residue from falling into the surrounding water at the time of their production. This effectively prevents the build-up or accumulation of the solid insoluble residue detectable trail along the water when they are jarred loose or otherwise released from the pool chemical dispenser, as occurred in prior floating pool chemical dispensers.

The concentric circle grid elements 28 of the cartridge tablet support grid 24 are connected to a plurality of generally triangularly shaped blades 34, best seen in FIG. 2. These blades 34 provide the necessary support and rigidity to the concentric circle grid elements 28 and also connect to the top 35 of the tablet support grid 24 upon which the lowest tablet of pool chemical rests. The top 35 of the tablet support grid 24 may be of equal height with the cartridge skirt insert 23 only extending a small distance above the lip 36 defining the top of the cartridge skirt insert 23 or a slight distance below, as is suitable to effectively control the immersion of the pool chemical tablet which it supports in the surrounding water.

The lip 36 of the cartridge skirt insert 23 extends outwardly beyond the generally cylindrical side of the insert 23 and fits within a groove 38 in the wall of the cartridge 11 near the bottom just above the cartridge skirt 22. The sidewalls of the cartridge 11 are smooth on the interior to prevent the build-up of any insoluble residue from the pool chemical. Just above the skirt 22 the wall of the cartridge 11 has an indentation 39 just above the groove 38. This indentation 39 forms the barrier for the upper limit of the movement of the lip 36 of the skirt insert 23 when the skirt insert 23 is inserted from the bottom into the cartridge skirt 22. The lip 36 snaps within the groove 38 to lockingly secure the skirt insert 23 in place.

FIG. 3 shows the alternate embodiment of the pool chemical dispenser 10' utilizing a cartridge 11' based on the same principles as that described with respect to FIGS. 1 and 2. The cartridge 11' is shown in solid lines and in phantom lines to illustrate the vertical adjustability of the cartridge by means of the cartridge-receiving steps 18' to vary the depth of immersion of the skirt 22' and the pool chemical contained within the cartridge 11' in the water. The cartridge 11' has a generally vertical alignment and locking groove 20' that sits upon an appropriately selected cartridge receiving step 18' to secure the cartridge 11' at the desired height in the center of the floater 12'. The floater 12' has a generally sloped top 15' with a circular edge 16' that rides in the water. Cartridge 11' has a top 25' that extends beyond the sides of the cartridge 11' to provide a location for gripping the cartridge 11' and for removing it from the floater 12'.

FIG. 8 shows in enlarged fashion the seating of the bottom of the vertical alignment and locking groove 20' on the desired step 18'. The cartridge receiving steps 18' are cut out of the sloped top 15' of the floater 12'. One of a pair of cartridge vertical grooves 30' is seen in FIGS. 3 and 8. The pair of vertical grooves 30' are separated by a slight distance between which sits visual indicator means 31', best seen in FIGS. 4–6, that is used to indicate when the cartridge is empty of pool chemical.

Figure 5:
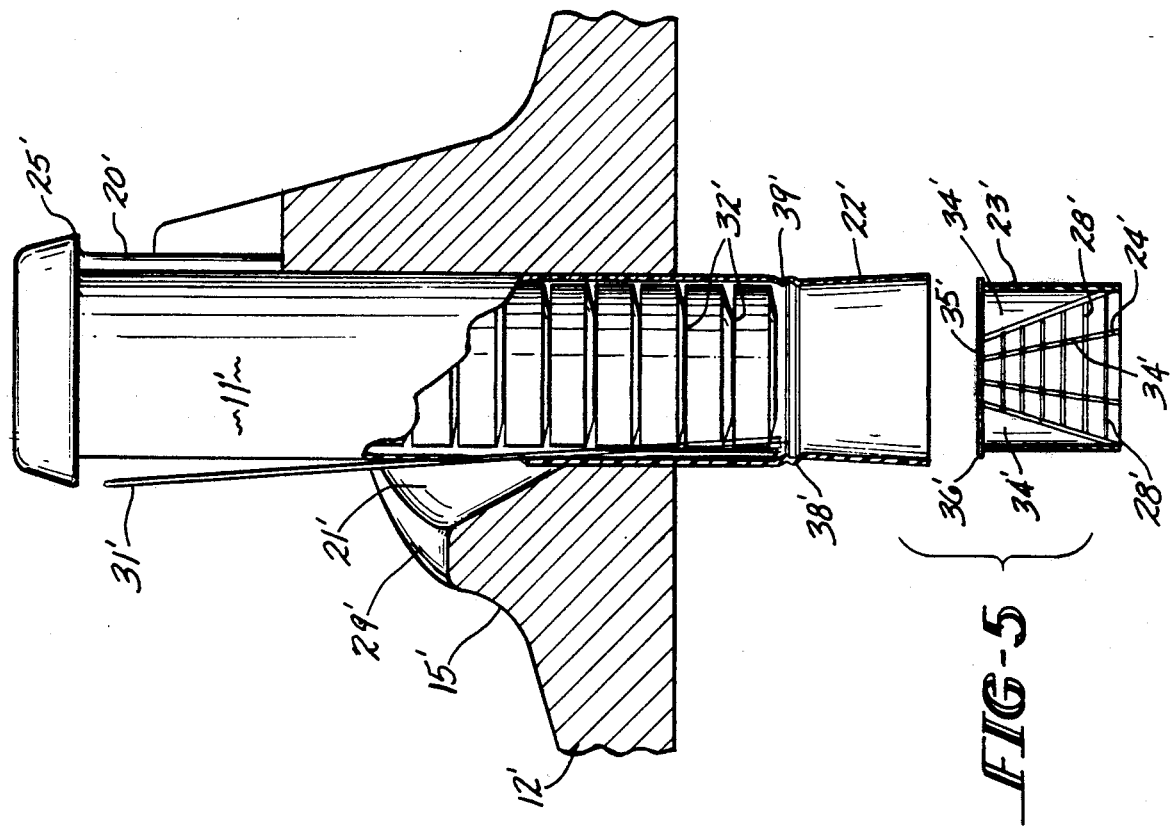
FIG. 5 is a sectional view showing a portion of the floater with the cartridge seated therein and a portion of the cartridge broken away to show the pool chemical tablet with the indicator flag in its raised position and the cartridge skirt insert with the tablet support grid removed therefrom.
Figure 4:
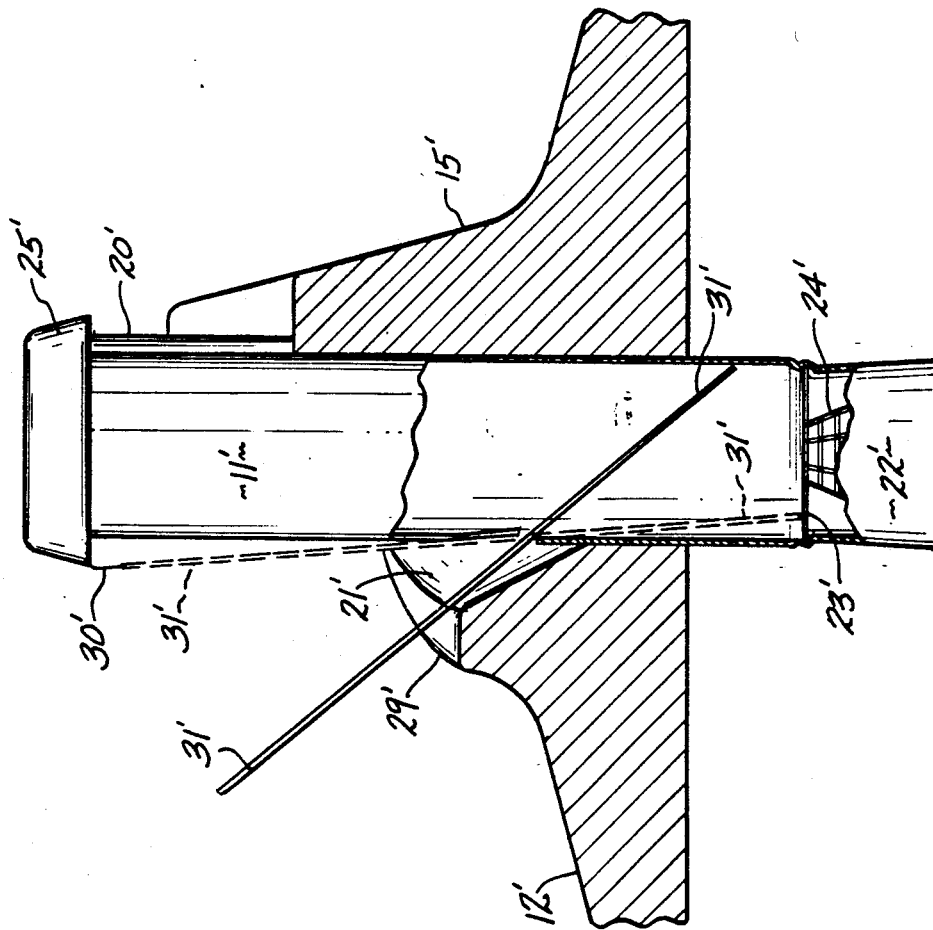
FIG. 4 is a partial sectional view of the pool chemical dispenser of FIG. 3 with the cartridge having the lower portion broken away to show a portion of the tablet supporting grid and the indicator flag in a raised position by phantom lines and in a lowered position by solid lines.

FIGS. 4 and 5 best illustrate how the cartridge 11' seats within the central opening 21' of the floater 12'. The floater 12' has an angled cut away portion 29' that exposes a portion of the cartridge 11' when the cartridge 11' is inserted within the floater 12' FIG. 5 shows, without the cartridge vertical grooves 30', the position of the original indicator means 31' in its fully raised position when the cartridge has some pool chemical, such as pool chemical tablets 32', remaining. The visual indicator means 31', in this instance a solid flag, inserts through a slot (not shown) in the side of the cartridge 11' so that it is appropriately hingedly supported at the point of passage through the sidewall of the cartridge 11' to permit it to pivot about that point of passage. Indicator means 31' can be retained in position by a pair of notches (not shown), for example, which retain it in place. The bottom of the indicator means 31' extends to a depth inside the cartridge 11' so that it will be retained in position by the last tablet 32' resting on the top 35' of the skirt insert 23'.

FIG. 4 shows the indicator means 31' in phantom line in the position corresponding to pool chemical remaining in the cartridge 11' and thereby holding the indicator means 31' in its raised position. The solid line illustration of the indicator means 31' in FIG. 4 shows the position when the supply of pool chemical has been depleted and has pivoted to its lowered position to indicate to the pool maintenance presonnel that the pool chemical is depleted.

The skirt insert 23' is shown in FIG. 5 in its fully removed or exploded position with respect to the skirt 22'. The concentric circle grid elements 28' are fastened to and are rigidly supported by the blades 34' as seen. As previously explained with respect to FIG. 2, these elements comprise the cartridge tablet support grid 24'. The lip 36' is shown in FIG. 5 as being an extension of the top of the cylindrical sidewall of the skirt insert 23' and serves the same locking purpose as described previously with respect to FIG. 2. Top 35' is shown as being on the same level as the lip 36'.

The cartridge skirt 22' is best seen in FIGS. 4 and 5 as being slightly flared outwardly from the groove 38' into which the lip 36' lockingly seats. As with the design in FIG. 2, indentation 39' of the wall of the cartridge 11' serves to limit the upward travel of the cartridge skirt insert 23' within the cartridge 11'.

FIG. 6 shows the partial lowering of the flag indicator means 31'. The indicator means 31' is retained in a partially raised positioned by the remaining portion of the pool chemical tablet 32'. The dotted line shows the full height of the last remaining tablet 32'. Insoluble residue 27' is shown passing through the tablet support grid 24'. It is the combined ability of the cartridge 11' to be vertically raised and lowered within the floater 12' and this unrestricted passage of insoluble residue 27' through the tablet support grid 24' that provides the unique features that permit this pool chemical dispenser to be effectively utilized with calcium hypochlorite pool chemical.

FIG. 7 shows a top plan view of the pool chemical dispenser 10', illustrating how the angled cut away portion 29' is oppositely positioned with respect to the cartridge-receiving steps 18' about the generally circular or central opening 21'. The sloped top 15' in the central portion of the floater 12' is also shown with the top 15' gently tapering outwardly to form a circular periphery bounded by the circular edge 16'. A handle grip 26' is provided in the floater 12' to facilitate carrying the floater 12' or the combined pool chemical dispenser 10'.

The ability to control the immersion depth of the cartridge 11' and the pool chemical tablets therein is a combined function of the diameter D, of the buoyant floater and the combined weight, G, of the floater and the cartridge, including the tablets within. This relationship can be expressed by the formula where the depth of immersion of the dispenser, H, is equal to the combined weight of the floater and the cartridge including the pool chemical tablets divided by the area of the floater. Since the area of a generally circular object can be calculated from the equation for the area of a circle, this can be expressed by the formula $H = 2.2G/D^2$.

The immersion depth in this equation can also be defined as being equal to the change of depth of immersion of the cartridge from full to empty as the tablets dissolve, if G is defined as the weight of the pool chemical. The cartridge is placed within the floater initially without pool chemical therein so that the depth of the water above the top 35 or 35' of the tablet support is measured and is then filled with pool chemical tablets. As an example, the change of immersion depth using an 18" diameter floater, 42 ounces of pool chemical tablet weight is calculated as follows: $H = 2.2 \times 42/18^2 = 0.29$ inches. For a 15" diameter floater with 64 ounces of pool chemicals tablets, the immersion depth is calculated as follows: $H = 2.2 \times 64/15^2 = 0.63$ inches.

In order to exemplify the results achieved with the pool chemical dispenser of the instant design the following examples are provided without any intent to limit the scope of the instant invention to the discussion therein. The examples are intended to illustrate the generally linear dissolving rate of calcium hypochlorite pool chemical tablets when used in a floater of the instant design with a dispensing cartridge having a cartridge skirt and skirt insert with tablet support grids of the type disclosed herein. The tablets placed within the cartridge are partially immersed in water to the particular immersion depth when empty as shown and can be used to feed from 1½ to 4½ ounces of pool chemical per day to sanitize bodies of water, such as swimming pools, ranging from about 10,000 gallons to about 30,000 gallons.

EXAMPLE 1

A 15 inch diameter floater with a cartridge was adjusted to obtain an immersion depth with the cartridge empty and the water above the top of the tablet support grid to a depth of about 0.25 inches. The pool chemical dispenser was then loaded with about 64 ounces of about 3 inch diameter tablets of calcium hypochlorite with about 1.5% lime added. The lime was added to assist in controlling the dissolving rate of the calcium hypochlorite. The pool chemical dispenser was then placed in about a 7500 gallon pool in which the water was circulated continuously for 24 hours a day at a rate of about 25 gallons per minute.

Figure 9:
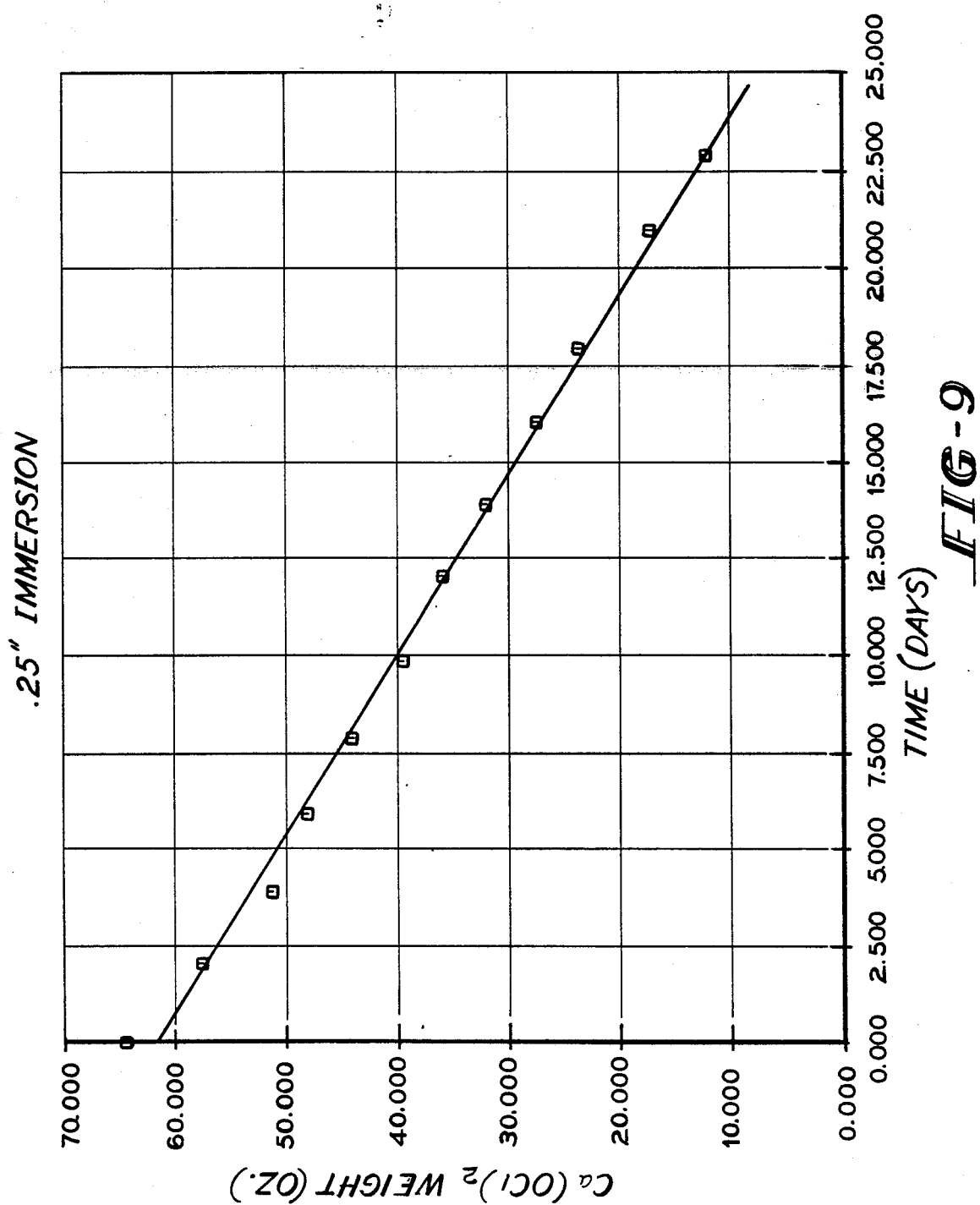
FIG. 9 is a graphical illustration of the dissolving rate of 3 inch tablets in the cartridge immersed in ¼ of an inch of water obtained by the use of a pool chemical dispenser with a 15 inch diameter floater apparatus.

The dissolving rate was recorded and is graphically illustrated in FIG. 9, with the weight being recorded about every 2 days and averaging about 2.17 ounces of chemical dissolved per day. The pH of the water in the pool was adjusted by the addition of muriatic acid every other day so that it was maintained between about 7.2 and 8.0. The available chlorine content was reduced to zero at the same time by adding about 35% hydrogen peroxide.

The pool chemical dispenser consisted of about 2 inch thick ring of styrofoam cut into a 15 inch diameter About a 3½ inch diameter hole was cut through the center. The tablets were placed in a 9 inch high glass tube with a diameter of about 3.54 inches. A 2 inch polyethylene sleeve was inserted into the bottom of the glass tubing and a cartridge skirt insert with the tablet support grid of the type disclosed herein was inserted within the polyethylene sleeve that formed the skirt of the cartridge.

The dissolving rate of the calcium hypochlorite tablets is graphically illustrated in FIG. 9. The weight of the remaining calcium hypochlorite was recorded every other day.

EXAMPLE 2

The same pool with the same type of pool chemical dispenser was employed as in Example 1. The pH adjustment and available chlorine reduction was accomplished as described. The empty cartridge was set with an immersion depth of about 0.50 inches.

About 64 ounces of about 3 inch diameter calcium hypochlorite tablets were placed within the cartridge. The tablets had about 1.5% lime content. Readings were recorded as in Example 1 and averaged out to about 2.24 ounces of calcium hypochlorite dissolved per day.

Figure 10:
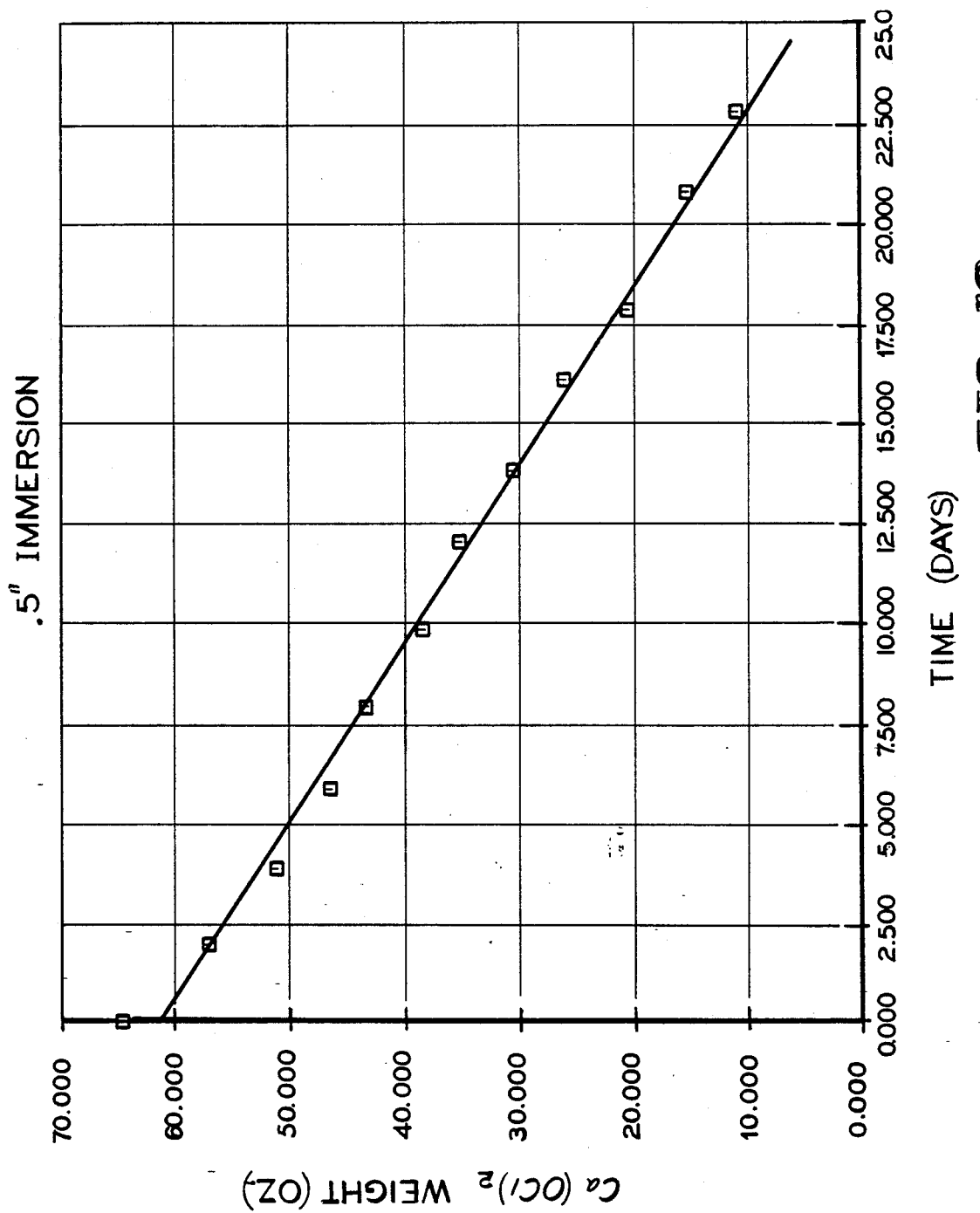
FIG. 10 is a graphical illustration of the dissolving rate of 3 inch tablets in the cartridge immersed in ½ an inch of water obtained by the use of a pool chemical dispenser with a 15 inch diameter floater apparatus.

The dissolving rate of the calcium hypochlorite tablets is graphically illustrated in FIG. 10. The weight of the remaining calcium hypochlorite was recorded every other day.

EXAMPLE 3

The pool chemical dispenser and pool of Example 1 were utilized with pH adjustment and available chlorine reduction techniques employed as in Example 1. About 64 ounces of about 3 inch diameter calcium hypochlorite pool chemical tablets with about 1.5% lime were utilized. The empty cartridge was set with an immersion depth of about 1.0 inches.

Figure 11:
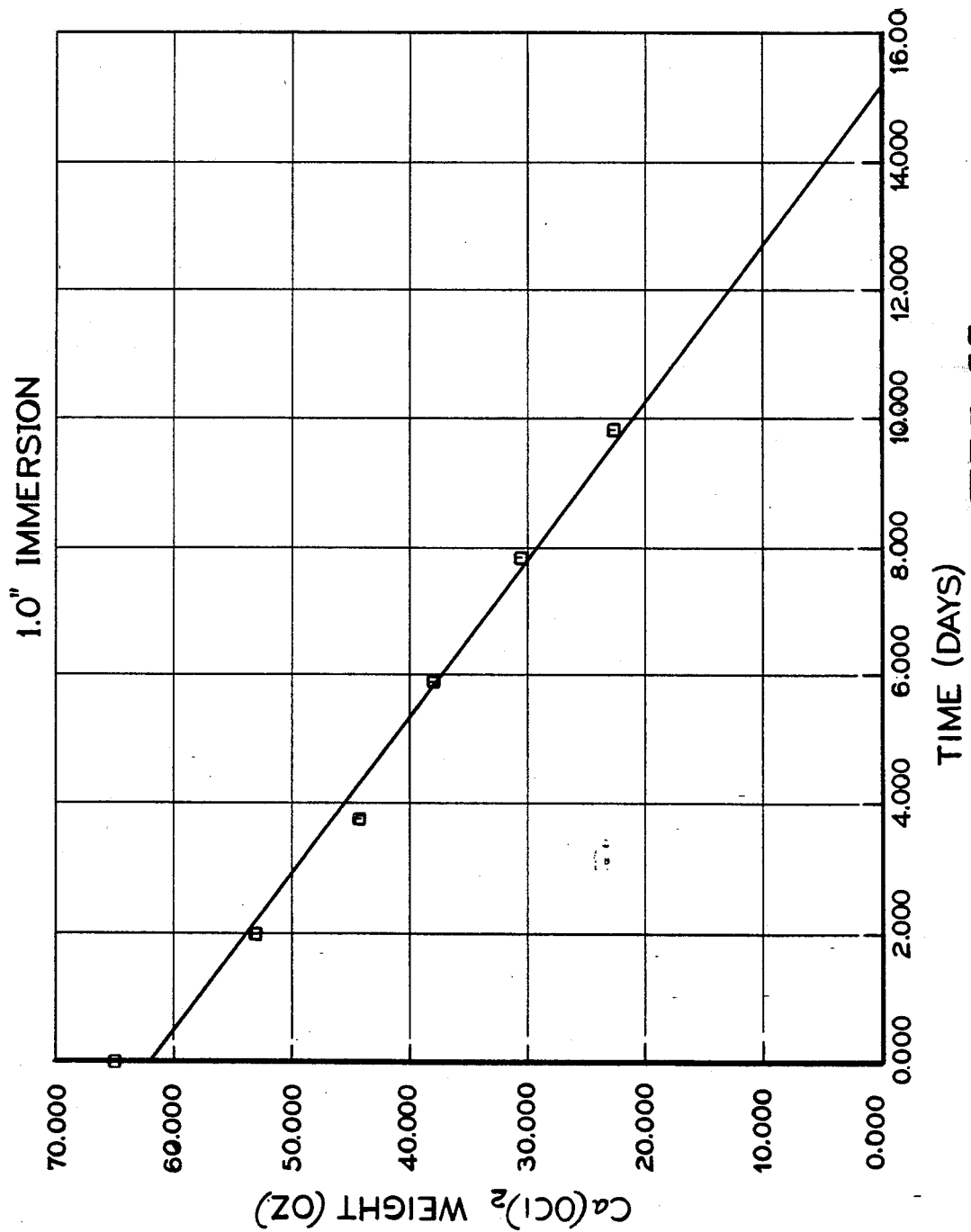
FIG. 11 is a graphical illustration of the dissolving rate of 3 inch tablets in the cartridge immersed in 1 inch of water obtained by the use of a pool chemical dispenser with a 15 inch diameter floater apparatus.

Readings of the remaining weight of the pool chemical tablets were taken as indicated in the graphical illustration of FIG. 11. The dissolving rate of the calcium hypochlorite pool chemical tablets averaged out to about 4.1 ounces dissolved per day.

EXAMPLE 4

About 64 ounces of about 3 inch calcium hypochlorite pool chemical tablets with about 1.5% lime were loaded into a pool chemical dispenser of the type described in Example 1. The pH adjustment and reduction of available chlorine techniques were accomplished as described in Example 1. The empty cartridge was set with an immersion depth of about 1.5 inches.

Figure 12:
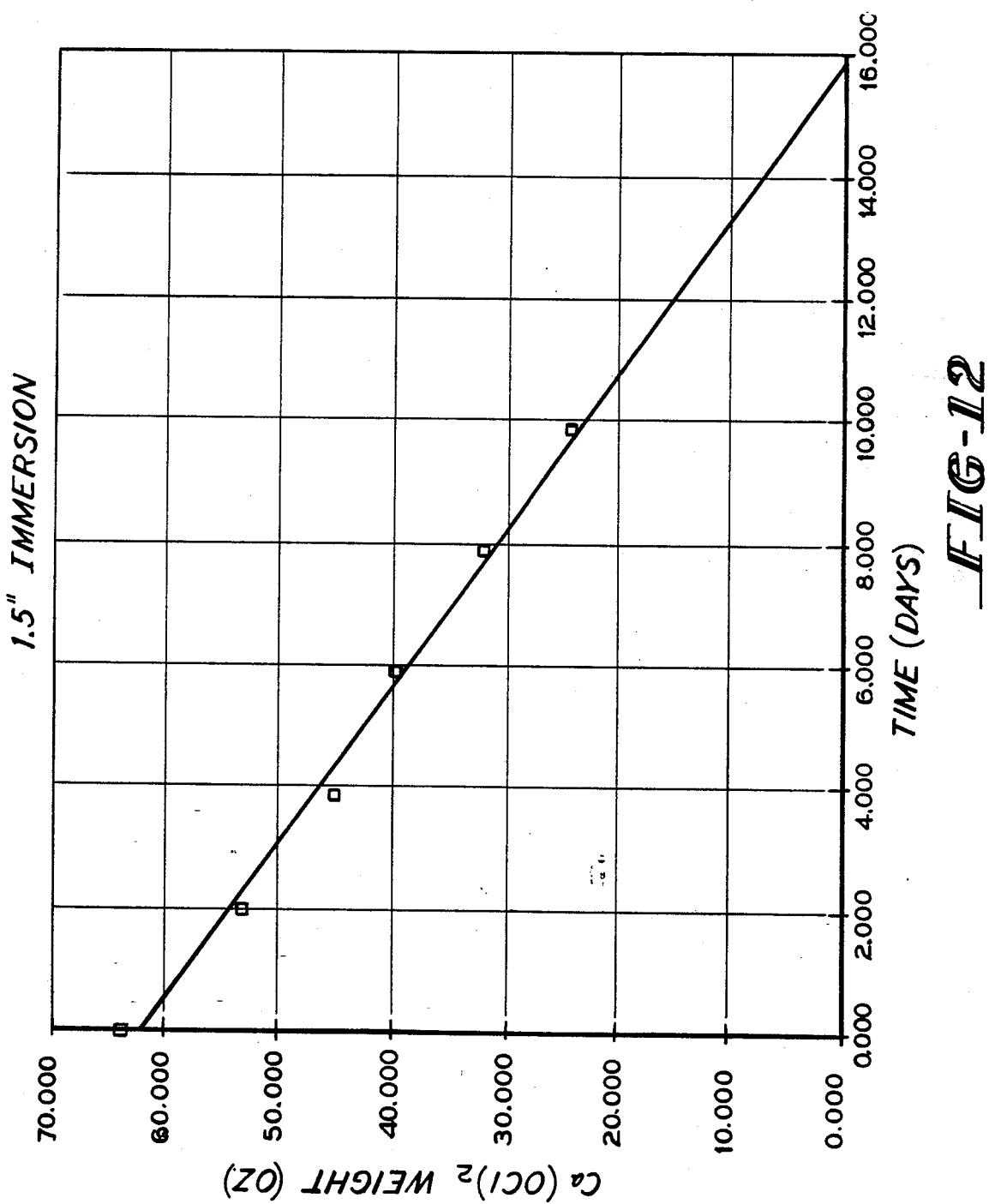
FIG. 12 is a graphical illustration of the dissolving rate of 3 inch tablets in the cartridge immersed in 1.5 inches of water obtained by the use of a pool chemical dispenser with a 15 inch diameter floater apparatus.

Readings were taken as shown in the graphical illustration in FIG. 12. The dissolving rate of the calcium hypochlorite pool chemical tablets averaged about 3.9 ounces dissolved per day.

This dissolving rate is lower than what is normally expected and what previously has been obtained, as can be seen from the subsequent example. A probable cause for this lower dissolving rate is the expansion of at least one of the tablets, combined with the original tablet diameter, to cause interference with the inner wall surface of the cartridge to restrict or inhibit the downward path of the upper tablets downwardly onto the top of the tablet support. This "hanging up" of one or more of the tablets can dramatically affect the dissolving rate and illustrates the importance of having the size or diameter of the pool chemical form, whether tablet or otherwise, a sufficient amount less than the inner diameter or dimension of the cartridge to compensate for tablet swell. Apparently the calcium hypochlorite chemical suspended over water absorbs moisture from the pool water, expanding and gradually becoming more soluble as long as the tablets do not hang up in the cartridge. Tablet swell of up to about 0.15 inches has been observed on tablets of about 2.1 inch diameter.

EXAMPLE 5

A series of tests were run in a 7500 gallon pool at about 26° C. with continuous water circulation by a circulating pump with 25 gallons per minute capacity. Four empty pool chemical dispensers of the design shown in FIG. 3 were set to the immersion depths shown below and then filled with about 42 ounces of about 2.1 inch diameter calcium hypochlorite tablets containing about 1.5% lime.

The dissolving rates were determined by recording the daily weight loss of the tablets. The pH of pool water and the available chlorine content reduction were controlled daily as described in Example 1.

TABLE 1

| Summary of Dissolving Rate Tests | | |
| --- | --- | --- |
| Immersion Depth (inches) | Dissolving Rate (ounces/day) | Dissolving Time (days) |
| 0.25 | 2.36 | 17.8 |
| 0.75 | 4.28 | 9.8 |
| 1.25 | 6.73 | 6.2 |
| 1.75 | 8.01 | 5.2 |

EXAMPLE 6

Cartridges of the type shown in FIGS. 4-6 were modified to have an extension of 0, 2 and 4 inches of cartridge skirt length beneath the groove. The cartridge insert of the type shown in those figures was inserted within the cartridges and the cartridges were filled with about 42 ounces of calcium hypochlorite tablets having about 2.1 inch diameter. The cartridges were fastened to the side of about a 7500 gallons pool with 24 hours continuous circulation with a circulating pump having about 25 gallon per minute capacity. The immersion depth was set so that the tablets were immersed in about 1 inch of water above the top of the tablet support. The dissolving rate in terms of ounces per day corresponding to the extension length is shown in the Table below.

TABLE 2

| Extension (in.) | Dissolving Rate (oz./day) |
| --- | --- |
| 0 | 3.82 |
| 2 | 2.93 |
| 4 | 2.72 |

This experiment showed the value of controlling or slowing the dissolving rate of the calcium hypochlorite pool chemical tablets by varying the length of the cartridge skirt. It appears with lengths of cartridge skirt above 2 inches that the dissolving rate is significantly reduced. However, with a skirt length of less than 2 inches from the locking groove, which is equal in height to the top of the tablet support, to the bottom of the cartridge into which the tablet support grid is placed significantly more accelerated tablet dissolution apparently occurs.

While the preferred pool chemical dispenser in which the principles of the present invention have been incorporated is shown and described above, it is to be understood that the present invention is not to be limited to the particular details or methods thus presented, but, in fact, widely different means and methods may be employed in the practice of the broader aspects of this invention. For example, although the materials employed for the floater were integral skin polyethylene foam, integral skin polyurethane foam or other comparable buoyant materials could be employed as the floater. Similarly, although the cartridges were made of blow molded polyethylene and the skirt insert with the tablet support grid was injection molded polyethylene, any other suitable material with similar performance characteristics and durability could be employed. The scope of the appended claims is intended to encompass all obvious changes in the details, materials and arrangements of parts which will occur to one of skill in the art upon a reading of the disclosure.

Having thus described the invention, what is claimed is:

1. A free-floating dispenser for dispensing a fast dissolving solid calcium hypochlorite chemical into a surrounding body of water comprising in combination:
    (a) a floater having an opening therethrough;
    (b) an elongated chemical-containing cartridge having a top and a bottom interconnected by a sidewall, the cartridge being insertable in the opening of the floater and extending below the floater holding a stack of fast dissolving calcium hypochlorite solid chemical tablets to be dispensed out through the bottom by dissolving into the surrounding body of water, the cartridge further being open-bottomed and having a sidewall skirt around the bottom connected to the sidewall and extending below the level of the solid chemical in the cartridge to permit water to enter through the bottom;
    (c) chemical support means insertable within the sidewall skirt and secureable therewithin to support the stack of fast dissolving calcium hypochlorite chemical tablets within the cartridge and control the passage of the solid chemical through the bottom of the cartridge and the passage of water around and beneath the solid chemical tablets; and
    (d) cartridge retaining means in the opening in the floater and on the sidewall of the cartridge cooperative with each other to hold the cartridge at selected elevations within the floater and thereby control the depth of immersion of the fast dissolving solid calcium hypchlorite chemical tablets directly in the water that has entered through the bottom of the open-bottomed cartridge from the surrounding body of water to obtain a uniform dissolving rate of the solid chemical.

2. The dispenser according to claim 1 wherein the chemical support means further comprises a grid connected to the sidewall skirt.

3. The dispenser according to claim 2 wherein the grid further comprises a plurality of concentric circle elements of decreasing diameter extending upwardly from the bottom of the cartridge.

4. The dispenser according to claim 1 wherein the cartridge further has a visual indicator means movably connected to the cartridge sidewall to signal when the fast dissolving solid chemical is depleted.

5. The dispenser according to claim 4 wherein the visual indicator means further is held in an upright position by being in contact with the stack of fast dissolving solid chemical tablets until the solid chemical is depleted and then moves to a visible position.

6. The dispenser according to claim 1 wherein the floater has a predetermined area and the floater, the chemical-containing cartridge, the cartridge retaining means and the chemical support means have a predetermined weight such that the dispenser is immersible to a determinable depth of immersion in the surrounding body of water, the depth of immersion of the dispenser and the stack of fast dissolving chemical tablets being determined by the combined weight of the floater, the cartridge retaining means, the chemical support means and the cartridge with the solid chemical tablets divided by the predetermined area of the floater.

7. The dispenser according to claim 6 wherein the floater is generally circular.

8. The dispenser according to claim 7 wherein the cartridge is generally cylindrical having an outer wall surface and an inner wall surface.

9. The dispenser according to claim 8 wherein the inner wall surface is smooth.

10. The dispenser according to claim 8 wherein the opening in the floater is generally circular.

11. The dispenser according to claim 8 wherein the outer wall surface has alignment means cooperative with the cartridge retaining means to retain the cartridge at selected elevations within the floater.

12. A chemical-containing cartridge for use with a dispenser that is buoyant in water, the cartridge containing solid chemicals comprising in combination:
    (a) a closed top;
    (b) an elongate, generally cylindrically shaped chemical-containing section connected to the closed top and having an outer wall surface and an inner wall surface, the outer wall and inner wall surfaces further having an opening therein and a visual indicator elongated tab that is held extending through said opening and against the inner wall surface when the cartridge contains solid chemicals and extends away from the outer wall when the cartridge contains no solid chemicals to indicate when the solid chemicals are depleted;

(c) an open-bottomed sidewall skirt connected to the chemical-containing section below the level of the solid chemical in the chemical-containing section, the open-bottomed sidewall skirt permitting chemical to exit and water to enter therethrough; and (d) chemical support means supporting the solid chemicals insertable within the sidewall skirt and securable therewithin to hold the chemical in fixed position so that water entering the open-bottomed sidewall skirt surrounds and immerses a portion of the chemicals, the chemical support means further having a grid that selectively controls the passage of solid chemicals therethrough to the open-bottomed sidewall skirt.

13. The cartridge according to claim 12 wherein the grid further comprises a plurality of concentric circle elements of decreasing diameter extending upwardly from the open-bottomed sidewall skirt toward the closed top.

14. A dispenser for dispensing solid chemicals into a surrounding body of water comprising in combination:

(a) a floater having an opening therethrough;

(b) an elongated chemical-containing cartridge insertable in the opening of the floater for holding solid chemicals to be dispensed by dissolving into the surrounding body of water, the cartridge being open-bottomed and having a sidewall and a sidewall skirt therearound to permit water to enter through the bottom, the cartridge further having an opening in the side, a visual indicator elongated tab extending through said opening and that is held against the cartridge sidewall when the cartridge contains solid chemicals and extends away from the cartridge sidewall when the cartridge contains no solid chemicals to indicate the solid chemicals are depleted;

(c) chemical support means insertable within the sidewall skirt and secureable therewithin; and (d) cartridge retaining means in the floater to hold the cartridge at selected elevations within the floater and thereby control the depth of immersion of the chemical in the surrounding body of water.

15. The dispenser according to claim 14 wherein the chemical support means further comprises a grid connected to the chemical support means to control the passage of solid chemicals through the bottom of the cartridge and the passage of water around and beneath the chemical.

16. The dispenser according to claim 15 wherein the grid further comprises a plurality of concentric circle elements of decreasing diameter extending upwardly from the bottom of the cartridge.

17. The dispenser according to claim 16 wherein the floater is generally circular.

18. The dispenser according to claim 17 wherein the cartridge is generally cylindrical having an outer wall surface and an inner wall surface.

19. The dispenser according to claim 18 wherein the opening in the floater is circular.

20. The dispenser according to claim 19 wherein the outer wall surface has alignment means cooperative with the cartridge retaining means to retain the cartridge at selected elevations within the floater.

* * * * *